Feb. 19, 1957 C. BLACHLY 2,781,571
APPARATUS FOR HANDLING AND LOWERING BURIAL CASKETS
Filed Dec. 12, 1955 4 Sheets-Sheet 1

INVENTOR.
Clark Blachly
BY Frank J. Schraeder Jr.
Attorney

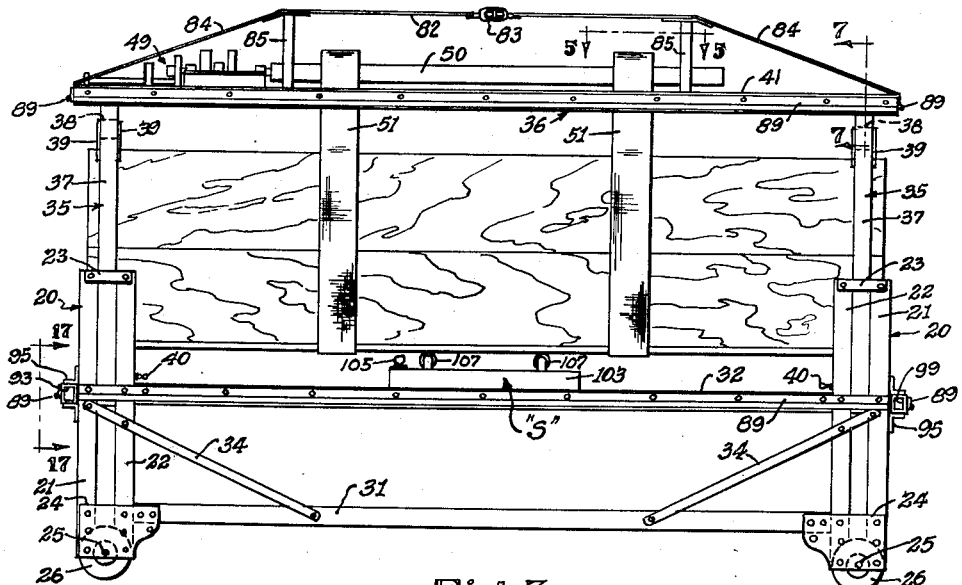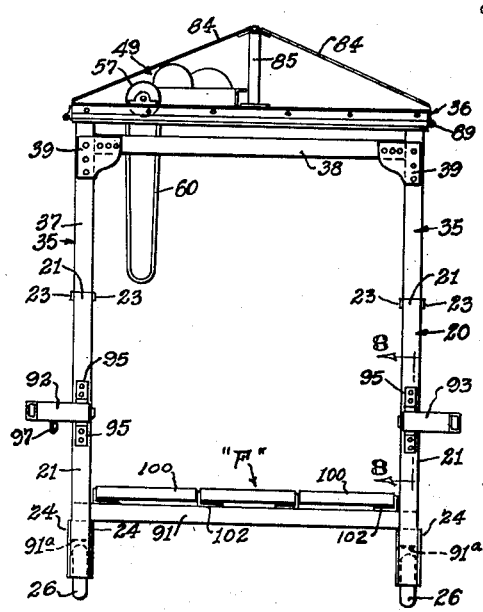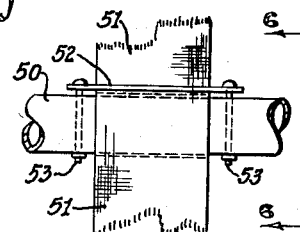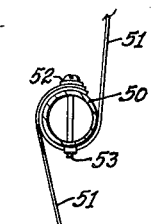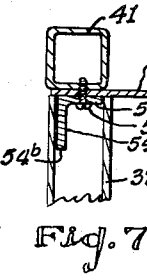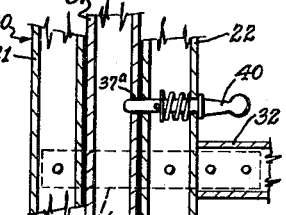

Feb. 19, 1957 C. BLACHLY 2,781,571
APPARATUS FOR HANDLING AND LOWERING BURIAL CASKETS
Filed Dec. 12, 1955 4 Sheets-Sheet 3

INVENTOR.
Clark Blachly
BY Frank J. Schraeder
Attorney

Feb. 19, 1957     C. BLACHLY     2,781,571
APPARATUS FOR HANDLING AND LOWERING BURIAL CASKETS
Filed Dec. 12, 1955     4 Sheets-Sheet 4
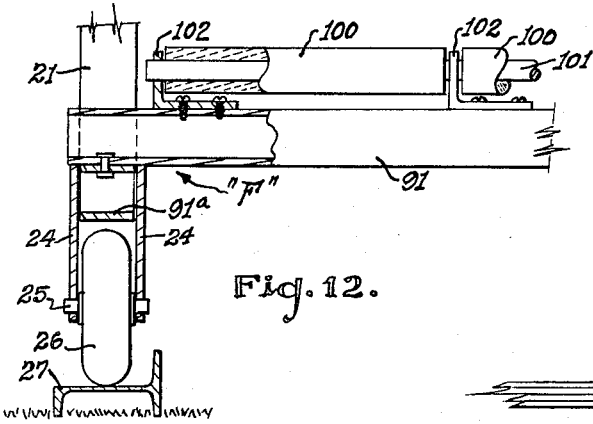
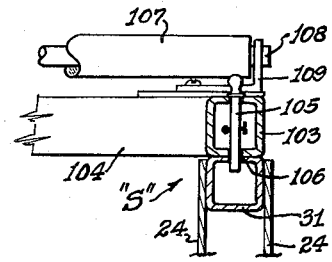
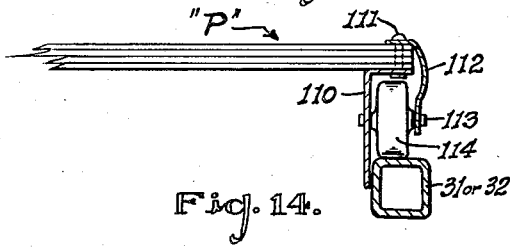
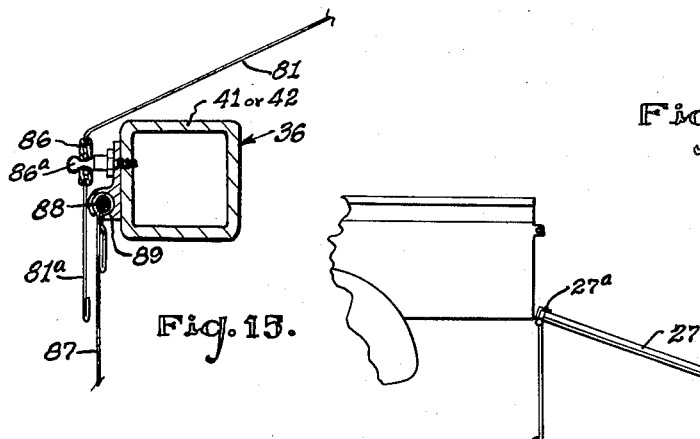
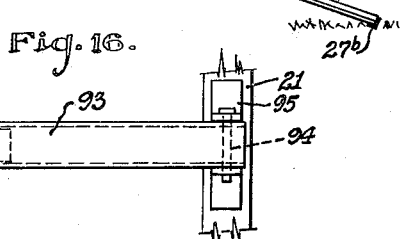
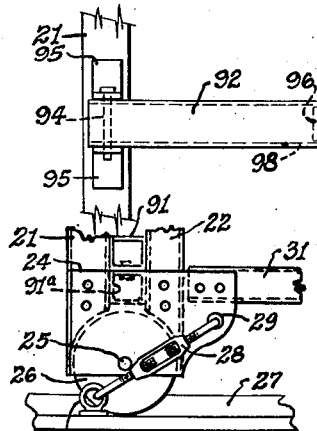
INVENTOR.
Clark Blachly
BY Frank J Shraeder Jr
Attorney United States Patent Office 2,781,571
Patented Feb. 19, 1957

2,781,571

APPARATUS FOR HANDLING AND LOWERING BURIAL CASKETS

Clark Blachly, Jamestown, Kans.

Application December 12, 1955, Serial No. 552,392

11 Claims. (Cl. 27—32)

The improved apparatus disclosed herein has among its objects to provide a light-weight, rigid and durable apparatus for handling burial caskets, vaults and rough boxes into and out of transporting vehicles and for lowering same from ground surface into the grave.

Another object of the invention resides in the prowhich shall be readily portable, conveniently operable and that will afford safety and controlled celerity in the transmission of the casket-incased body from ground surface into the grave.

Another object of the invention is found in the provision of casket raising and lowering apparatus that shall be constructed of assembled detachably interconnected units; the units being securely detachably connected together by their respective interfitting parts or members securely interengaged with one another without the use of securing bolts, screws or tools.

Still another object of the invention resides in the provision of portable burial apparatus of rectangular planar form adapted for laterally and vertically moving a casket and lowering the latter into a grave composed of a plurality of detachably interconnected front and rear side structural units including upright laterally spaced parallel twin corner posts; end frame units having post members vertically adjustable while slidably carried between the twin upright elements of the corner posts; a top unit, carrying a casket raising and lowering mechanism, detachably supported on the post members of the end frame units; lateral track members carried on the front and rear side structural units each having their ends rigidly connected with a pair of said twin corner posts; and mobile means carried on the track members for facilitating the lateral movement of the casket within the apparatus to center the casket over the grave cavity.

The various features of novelty whereby the present invention is characterized will hereinafter be pointed out with particularity in the claims, but, for a full understanding of the invention and of its objects and advantages, reference may be had to the following detailed description taken in connection with the accompanying drawings wherein I have embodied a preferred form of my invention.

In the drawings wherein like reference characters designate like or corresponding parts or members:

Fig. 3 is a skeleton view of the front side of the apparatus showing a casket rough box supported on lowering straps.

Fig. 4 is a skeleton view of one end of the apparatus showing the framing of the structure, the hoist mechanism, and the entrance gate at that one end in open position.

Fig. 5 is a fragmentary plan view taken on line 5—5 of Fig. 3 showing the casket raising and lowering straps and the clamp for operatively connecting them to the tubular drum shaft which is driven by the hoist mechanism.

Fig. 6 is an end view of Fig. 5 looking in the direction of arrows 6—6.

Fig. 7 is a vertical section taken on line 7—7 of Fig. 3 showing connection of the top frame unit to one of the four vertically adjustable supporting post members.

Fig. 8 is a vertical section through a medial portion of one of the four corner post units showing a spring-loaded pin for retaining the vertically adjustable supporting post member in raised position and also showing a metallic strap for connecting an end of the upper level horizontal track member to the pair of laterally spaced vertically disposed relatively stationary twin post members of one of the four corner post units.

Figure 9:
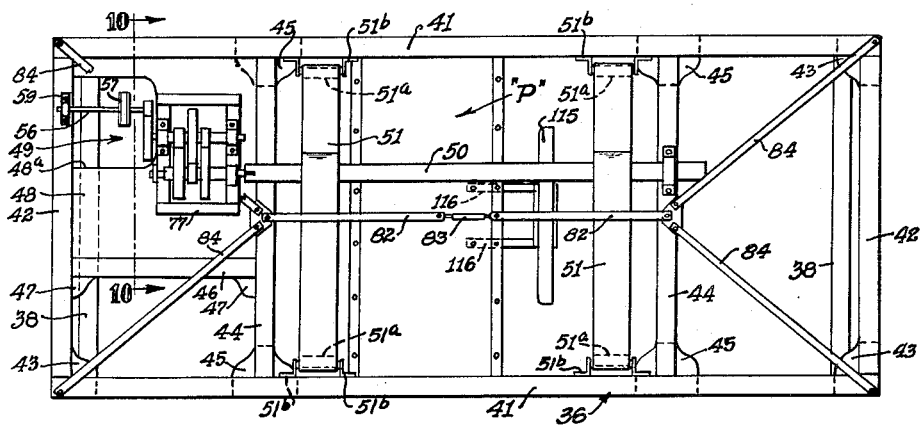

Fig. 9 is a plan view of the top frame unit showing the hoist mechanism, casket handling straps, and structural members of the top frame unit.

Figures 10, 11:
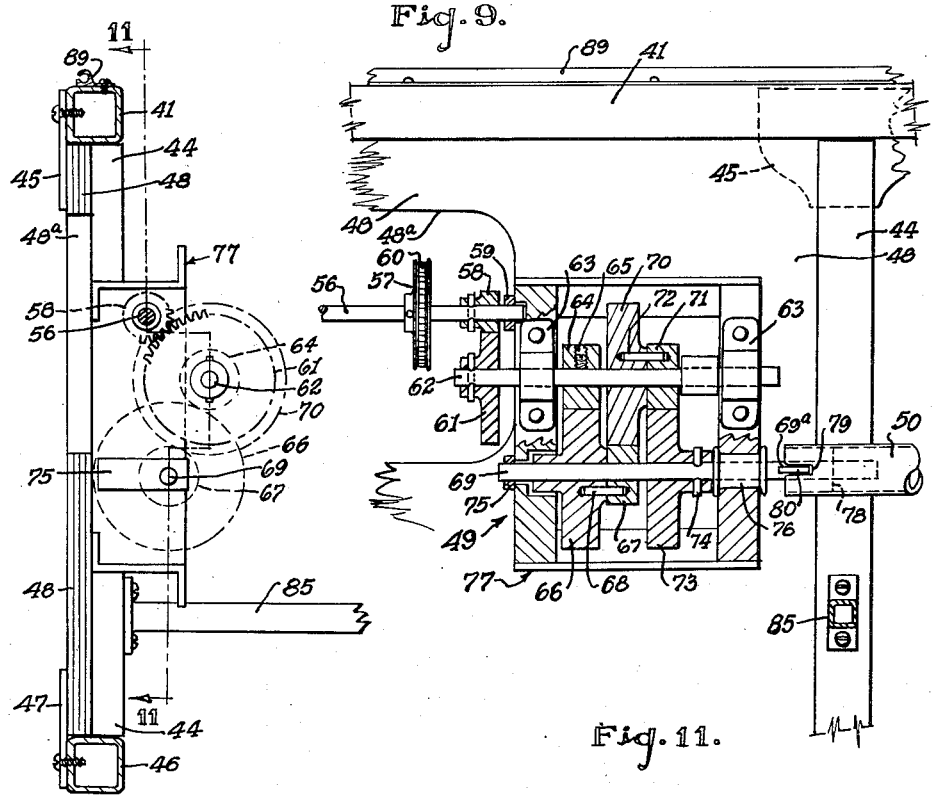

Fig. 10 is a cross-section taken on line 10—10 of Fig. 9 in enlarged scale showing the hoist mechanism.

Fig. 11 is a cross section taken on line 11—11 of Fig. 10 showing the gear train.

Figure 2:
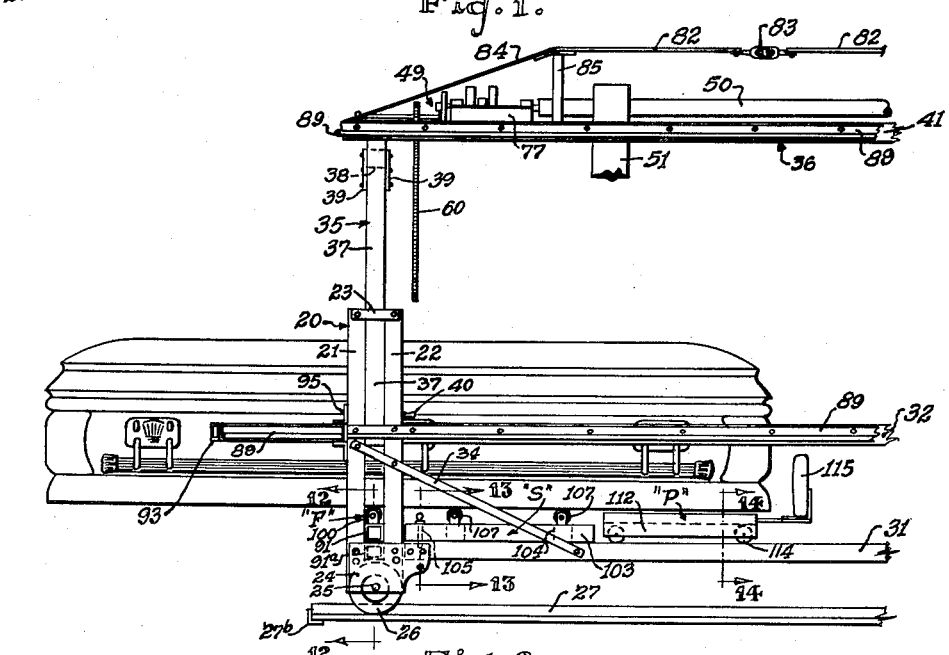
Fig. 2 is a skeleton view of a front end portion of the structure of the apparatus showing the casket lowering mechanism and a casket being entered into the apparatus; the covering for the apparatus being removed to more clearly disclose the apparatus.

Fig. 12 is a vertical section taken on line 12—12 of Fig. 2 showing one end of the casket entrance fixed roller unit in enlarged scale to more clearly show the framing of the structure at one of the four corner supporting wheels.

Fig. 13 is a vertical section taken on line 13—13 of Fig. 2 showing one end of the intermediate casket supporting movable roller unit in enlarged scale to more clearly show the pin for securely locking the unit in predetermined laterally adjusted positions on the side horizontal tubular track members therefor.

Fig. 14 is a vertical section taken on line 14—14 of Fig. 2 showing one side of the casket end supporting carriage movably mounted on one of the side tubular track members therefor.

Figure 1:
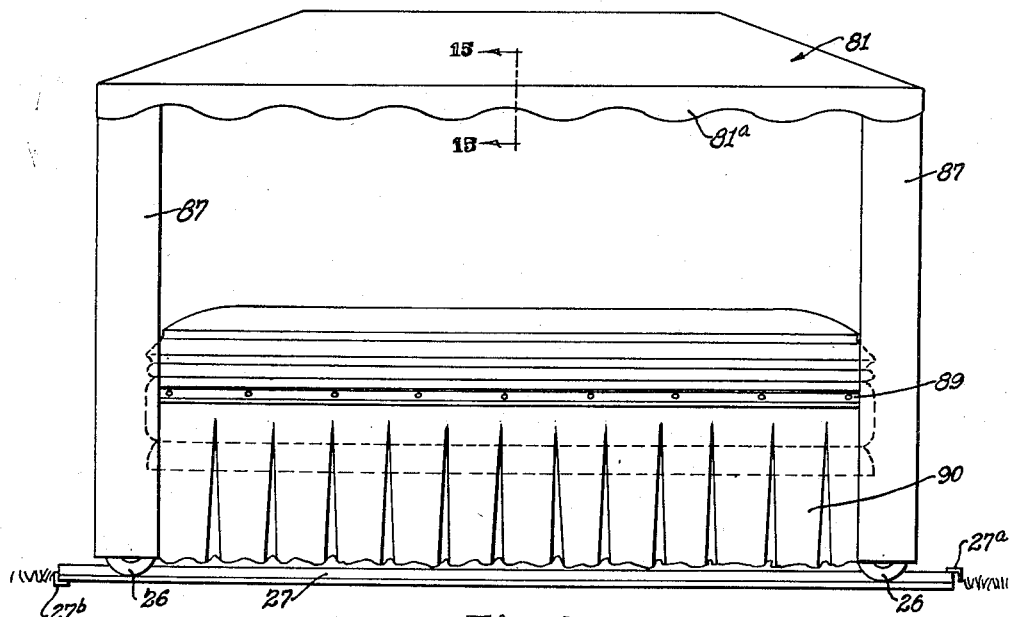
Fig. 1 is a front elevation of the apparatus with the central portion of the front curtain drawn to expose a casket supported in the apparatus prior to lowering same into the grave.

Fig. 15 is a vertical section taken on line 15—15 of Fig. 1 showing a cross section of one of the horizontal frame members of the top frame unit together with a portion of the waterproof canvas canopy extending over the roof and eaves secured by snap fasteners to the horizontal frame member; the eave extension of the canopy overhanging the upper ends of the side and end curtains.

Fig. 16 is an illustration showing the use of the apparatus track base employed as a ramp adapted for loading or unloading the apparatus, casket or vault respectively onto or from a pick-up truck.

Fig. 17 is an enlarged elevation of the gate at one end of the apparatus.

Fig. 18 is a side elevation of the wheel-supported corner of the structure of the apparatus showing one method of anchoring the apparatus to the supporting track base.

The structure of the apparatus, in plan view, is of rectangular shape and is constructed principally of main structural members of tubular cross-section, flat gusset plates, angle irons and elongated strap braces, all preferably of aluminum material so that the apparatus is light in weight and easily portable; the hoist mechanism may be made of cast iron or steel to resist wear and thus prolong its life and impart to same the necessary safe strength and stability although a further reduction of its weight may, if so desired, be attained by the use of aluminum alloys or magnesium alloys.

The apparatus may be considered and generally described as composed of assembled detachably interconnected units consisting of front and rear side structural units, end structural units, a top frame unit, and the several mobile instrumentalities carried on the structure for facilitating handling the casket individually or in its container from ground surface and into the grave.

The front and rear side structural units

The front and rear sides are similar in structure and are more clearly shown in Figs. 1, 2, 3, 4, 8, 12, and 13 and comprise four corner post units generally designated by numeral 20 and each consisting of a pair of laterally spaced upright parallel posts 21 and 22 held securely at their upper ends in spaced relation by a pair of lateral side straps 23 riveted to opposite sides thereof and at their bottom ends by a pair of base plates 24 also riveted to opposite sides thereof.

Each pair of base plates 24 supports an axle 25 for a suitable wheel 26 rotatably mounted on the axle 25 between the base plates 24; the bottom ends of the posts 21 and 22 being cut off to clear the wheel 26 as more clearly shown in Fig. 18 wherein is also shown one preferred means for anchoring the apparatus to a base track 27 at a centered position over the grave, such anchoring means consisting of a turnbuckle 28 having one end hooked into an aperture 29 in the outer one of the base plates 24 and its opposite end hooked into an eye bolt 30 secured to the track 27, preferably two of such anchoring means being employed at opposite ends of the base.

Two of the corner post units 20, at each side of the apparatus, are rigidly connected together by a lateral tubular lower level track member 31 having opposite ends thereof riveted to and between the base plates 24 and these same corner post units 20 are also rigidly interconnected by a lateral tubular upper level track member 32 by means of connection bars 33 that are riveted to the inner sides of posts 21 and 22 and to the inner sides of the ends of the track member 32 as more clearly shown in Fig. 8.

To further stiffen and stabilize the front and rear side frames a diagonal brace 34 is riveted at one end to the medial portions of posts 21 and 22 and at its opposite end to a medial portion of the lower level track member 31 as clearly shown in Fig. 2.

The end structural units

The opposite ends of the structure are provided with transverse stiffening and stabilizing frames, generally designated by numeral 35, constituting vertically adjustable supports for the top frame unit generally designated by numeral 36.

Each of the transverse end frame units 35 consists of a pair of vertical posts 37 that are slidably adjustably supported between the posts 21 and 22 of each corner post unit 20; the upper end portions of each pair of end posts 37 being rigidly connected together by a transverse lateral tubular member 38 including corner connection plates riveted to the ends of member 38 and upper portions of posts 37.

To retain the top frame unit 36 in elevated position, as shown in Figs. 1, 2, 3 and 4, each of the inner posts 22 is provided with a slidably mounted spring-loaded locking pin 40 which is adapted to be slidably inserted in a hole 37$^a$ in an adjacent side of the post 37, shown in Figs. 2, 3 and 8.

The top frame unit

The top frame unit is generally designated by numeral 36 and consists of tubular front and rear side members 41 transversely connected to transverse tubular end members 42 by gusset plates 43. Further transverse stiffening and hoist mechanism supports consist in the intermediate transverse tubular members 44 that are rigidly connected to the side members 41 by gusset plates 45. A longitudinally disposed tubular support 46 at one end of the top frame 36 in the lateral plane of one of the transverse members 44 rigidly interconnects same with one of the end members 42 by means of gusset plates 47. Supported on the gusset plates 45 and 47 is a base plate 48 which supports the hoist mechanism and may consist of a substantial sheet of plywood.

The entire top frame unit 36 is adapted to be detachably secured to the upper ends of each of the four vertically adjustable posts 37 by any suitable means as, for example, an angle iron 54 that has a lateral leg 54$^a$ secured to the bottom face of the gusset plate 43 as by a screw 55 that passes through the gusset plate 43 and into the top frame tubular end member 41; the transverse width of the lateral leg 54$^a$ fitting closely into the interior of the post 37 and the vertical leg 54$^b$ being disposed close to the inner face of one of the walls of the post 37, as clearly shown in Fig. 7, thus the entire top frame unit 36 may readily be lifted off of its supporting posts 37, without tools, and transported independently as a unit.

The hoist mechanism

The hoist mechanism, generally designated by numeral 49 and shown more clearly in Figs. 9, 10 and 11, comprises a manually driven mechanism providing a substantial reduction in speed to the tubular drum shaft 50 which imparts the desirable manually controlled raising and lowering motions to the two casket raising and lowering straps 51 which are adapted to be looped under the bottom of a casket, or over the top of the casket and under the casket handle bars, or under the bottom of a casket box or vault and which straps 51 have overlapping ends thereof detachably secured to the drum shaft 50 in any suitable manner as, for example, by a clamp bar 52 of arcuate cross-section and securing bolts 53, as shown in Figs. 5 and 6; the straps being trained over corner rollers 51$^a$ rotatably carried on angle irons 51$^b$ secured to the inner sides of side members 41.

The hoist mechanism includes the drive shaft 56 which has secured thereto a sprocket wheel 57 and a spur gear 58; the drive shaft 56 being rotatably supported in bearings 59 and the sprocket wheel 57 being adapted to be manually driven by a circuitous sprocket chain 60 that extends downwardly through the opening 48$^a$ in the base plate 48 for convenient operation by the funeral director.

The spur gear 58 is operatively in mesh with gear 61 that is secured to and drives shaft 62 which is rotatably supported in bearings 63.

A spur gear 64 is secured to shaft 62, as by a set screw 65, and drives the gear 66 which is clustered to spur gear 67 by a shear pin 68 for conjoint free rotation on shaft 69. The spur gear 67 drives the gear 70 which is clustered to spur gear 71 by a shear pin 72 for conjoint free rotation on shaft 62. The spur gear 71 drives the gear 73 which is secured to shaft 69 as by pin 74.

The driven shaft 69 is rotatably carried in bearings 75 and 76 which together with bearings 63 are securely supported on a preferably cast aluminum base 77.

The driven shaft 69 extends outwardly beyond the bearing 76 into and through a bushing 78 that is securely pressed into the end of the drum shaft 50 for rotation therewith. The shaft 69 is provided with a transverse axial slot 69$^a$ that is adapted to be aligned with a transverse axial slot 79 which extends into and through the bushing 78 and drum shaft 50 inwardly axially from their outer ends. A blade key 80 is removably wedged into the slots 69$^a$ and 79 and constitutes means providing a clutch for imparting rotation from shaft 69 to drum shaft 50. Reverse rotations of the sprocket wheel 57 by the manually operated chain 60 transmit reverse rotations to the drum shaft 50 to impart reverse movements to the straps 51 for raising or lowering the casket or other object suspended thereby.

In order to expedite the detachment of the straps 51 from the drum shaft 50 and object carried by them, without operating the hoist mechanism, the drum shaft 50 may be quickly declutched from the drive shaft 69 by axially shifting same along shaft 69 until the aligned slots in the drum shaft 50 and bushing 78 are disengaged from the blade key 80 whereupon the drum shaft 50 will be released for free rotation by a pull on the straps 51 to strip them off the drum shaft until their ends are exposed for detachment from their clamping engagement with the drum shaft.

The top frame unit 36 also carries means for supporting the canvas top 81 which consists of a ridge bar 82 having ends securely connected to the four corners of the side members 41 by means of the diagonal straps 84; a turnbuckle 83 within the ridge bar 82 providing means retaining the bar 82 and straps 84 taut.

The ends of the ridge bar 82 are rigidly supported in elevated position by means of vertical tubular posts 85 securely supported at their bases to the transverse members 44.

As shown more clearly in Figs. 1 and 15, the apparatus is provided with a suitable waterproof canvas cover comprising the top 81 and side and end curtains affording protection for the casket from the elements around the grave during the services there conducted and for this purpose the canvas top 81 is provided with suitable snap fasteners 86 within the depending eave extension 81ª that overhangs the side and end curtains 87; the snap fastener rings being adapted to embrace the ball-headed pins 86ª which are securely screwed in the top side and end tubular members respectively designated by numerals 41 and 42.

The side and end curtains 87 hang from suitable flexible ropes 88 which are slidably retained in elongated tubular brackets 89 that are securely attached to the outer sides of the top frame side and end members respectively designated by numerals 41 and 42 and the short pleated drapes 90 at the sides and ends of the apparatus are hung in similar manner from the elongated tubular brackets 89 which are secured to the outer faces of the upper level track members 32 and the end gate members 92, 93 and 99 as shown in Figs. 1, 2 and 3.

The opposed ends of the structure, in addition to the detachably mounted stiffening and stabilizing frame units 35, are each provided with a tubular transverse member 91 which extends between lower portions of the posts 21 and 22 and loosely rests on the upper edges of the inner base plates 24 and to provide a detachable connection between the end of each transverse member 91 and the base plates 24, to thereby prevent longitudinal displacement of the member 91, short sections of similar size tubing 91ª are riveted to the bottom faces of the ends thereof which sections are adapted to be positioned between the two base plates 24 at the lower ends of the corner posts 20, thus the front and rear side structural frame units, the end frame units 35, the top frame unit 36, and the transverse stiffening members 91 may be readily disassembled for independent transportation and likewise readily reassembled for use, without the use of tools.

As a further means of stiffening and stabilizing the structure, the left end of the structure, as viewed in Fig. 2, is provided with a casket entrance gate comprising, as viewed in Figs. 2, 4 and 17, a pair of tubular gate members 92 and 93 which are pivotally carried at their outer ends on vertical headed-pins 94 slidably carried in angle iron supports 95 secured to posts 21. To retain the gate in closed locked position, a bolt 96 is adapted to be slidably moved, by its handle 97 that depends through a slot 98 in the bottom wall of gate 92, into the gate 93 to bridge the gap between the inner adjacent ends of the gate members 92 and 93.

The gate at the opposite end of the structure designated by numeral 99 in Fig. 3, may be similar to the gates 92 and 93, however, this end gate 99 may be made in one piece of tubular material and opened by withdrawing same from its angle iron supports after slidably withdrawing the pivot pins 94.

*The mobile instrumentalities*

The mobile accessories for handling the casket, casket box or vault longitudinally of the apparatus comprise a fixed entrance roller unit designated by letter "F," a slidably adjustable normally stationary roller unit designated by letter "S," and a wheel-supported movable platform designated by letter "P."

The fixed entrance roller unit F shown clearly in Figs. 2, 4 and 12 comprises the tubular transverse member 91 which functions as a base for a plurality of rollers 100 mounted on a shaft 101 that is rotatably supported on a plurality of angle irons 102 which are fixed to the top face of the base member 91 as shown in Figs. 4 and 12.

The slidably adjustable roller unit S shown in Figs. 2, 3 and 13 comprises a base constructed of tubular longitudinal and transverse members respectively designated by numerals 103 and 104; the longitudinal side members being adapted to be slidably positioned where desired upon the top of member 31 (or member 32 as shown in Fig. 3) and locked against displacement by pin 105 slidably inserted in one of several holes 106 in the top wall of member 31 (or member 32). Mounted upon the top of the base are a plurality of rollers 107 (similar to rollers 100) which are rotatable with shaft 108 rotatably carried on a plurality of angle irons 109 secured to the base structure.

The wheel-supported movable platform P shown in Figs. 2, 9 and 14 comprises a plywood platform supported on a pair of end angle irons 110 riveted thereto by rivets 111 which rivets also secure thereto, on opposite ends of the platform, depending backets 112 which together with the angle irons 110 support opposite ends of shafts 113 carrying rollers 114 adapted to roll the platform along the tops of the lower or upper level tubular members respectively designated by numerals 31 and 32. The platform is provided with an upstanding upholstered abutment 115 slightly laterally spaced from the rear side of the platform and rigidly supported on a pair of bars 116.

As viewed in Fig. 2, a casket is shown entering the apparatus through the open gate 92, 93 while roller-supported on rollers 100 and 107; the inner end of the casket being positioned about to engage the abutment 115 of platform 109. It is important to note that in this position the bottom of the casket is slightly spaced from the top of the platform P, in other words, the top of the platform is disposed slightly below a horizontal line tangent with the tops of rollers 100 and 107 which, in such position of the casket, carry the greater portion of the weight of the casket while the platform P remains in stationary position until a further inward movement of the casket causes its inner end to engage the upholstered abutment 115 whereupon the platform is caused to be moved by the casket until by overbalance the greater portion of the weight of the inner end of the casket moves downward and is assumed and carried by the platform the remaining portion of its movement until centered over the grave.

While in such centered position over the grave and while supported on the rollers of the roller unit S and on platform P, the straps 51 may then be trained or looped under the bottom of the casket, or over the top of the casket and under both side handle bars, whereupon the operation of the hoist mechanism by operating chain 60, the casket then may be slightly lifted to permit the removal of the roller unit S and platform P and thereafter, by reverse operation of the hoist mechanism by chain 60, permit the casket, while suspended on straps 51, to be slowly lowered into the box or vault within the grave.

The primary use of the upper level track members 32 shown in Figs. 2, 3 and 8 is to facilitate the loading or unloading of a casket, casket box or vault from or onto a motor truck employing in such operations any suitable available dollies or the roller unit S and rolling platform P.

Although the apparatus may be used on level ground without the track base 27, it is preferable to use same to insure the stability and fixed centering of same over the grave. The longitudinal tracks 27 may be of any suitable cross-section as, for example, shown in Fig. 12, and ends of the parallel tracks 27 are rigidly held together in proper spaced relation by a pair of transverse angle irons 27a and 27b welded or otherwise secured to the tracks 27; the angle irons 27a and 27b being relatively reversedly disposed with angle iron 27a having its lateral leg over the base portions of tracks 27 to permit its vertical leg to be hooked over the hinged end of the rear gate of a pick-up truck when the track base is used as a loading or unloading ramp, as shown in Fig. 16.

While I have illustrated and described a presently preferred form in which my invention is capable of being embodied, it will be obvious that modifications may be made in the details of construction without departing from the spirit of my invention and its scope defined in the hereto appended claims.

I claim:

1. Portable burial apparatus adapted for laterally and vertically moving a casket and lowering same into a grave: comprising assembled detachably interconnected units consisting of front and rear side structural units each including at both ends thereof a pair of upright laterally spaced parallel twin posts and means for retaining said twin posts in spaced parallel positions; end frame units each including a pair of laterally spaced vertical, parallel post members and transverse lateral means rigidly secured to and interconnecting the upper ends of said post members, each of said vertical post members being vertically adjustable and slidably carried within the space between one of said pairs of upright parallel twin posts, means for retaining said post members in vertically adjusted positions; a top frame unit, carrying casket raising and lowering mechanism, supported on said end frame units; and mobile means carried on said front and rear side structural units adapted for supporting the casket while the latter is moved laterally thereon within the apparatus to center the casket over the grave; said units being adapted to be assembled for use at the grave with only detachable connections between them.

2. Portable burial apparatus as set forth in claim 1 wherein said pairs of twin posts of said front and rear side structural units are rigidly interconnected near their lower ends by longitudinally extending track members, said mobile means being movably mounted on said track members.

3. Portable burial apparatus as set forth in claim 1 wherein said pairs of twin posts of each of said front and rear side structural units are rigidly interconnected near their lower ends by a longitudinally extending lower level track member and including a longitudinally extending lower level track member and including a longitudinally extending track member rigidly interconnecting said pairs of twin posts at a level higher than said lower level track member, both of said track members being in a common vertical plane, said mobile means being adapted to be selectively movably mounted on either pair of said track members.

4. Portable burial apparatus as set forth in claim 1 and including a pair of stabilizing members extending transversely of and at both ends of the apparatus each detachably connected at its ends with a pair of said twin posts disposed at corresponding ends of said front and rear side structural units.

5. Portable burial apparatus as set forth in claim 1 wherein each pair of said twin posts is provided with a pair of gusset plates embracing opposite sides of the bottom ends thereof, a wheel carried on and between each pair of said gusset plates, a horizontal stabilizing member extending transversely of the apparatus, within the vertical plane of said post members of each end frame unit, detachably connected at its ends with a pair of said twin posts that are disposed at corresponding ends of said front and rear side structural units, the ends of said stabilizing members loosely resting on the upper edges of said gusset plates and having rigidly secured thereto depending means disposed between said gusset plates for detachably interlocking said stabilizing members with said twin posts against lateral displacement but permitting vertical displacement and removal of said stabilizing members, and including roller means extending longitudinally of and carried on one of said stabilizing members.

6. Portable burial apparatus as set forth in claim 1 and including a pair of horizontal members extending transversely of the apparatus, each member of said pair being detachably connected at its opposite ends with a corresponding one of said twin posts of said front and rear side structural units, one of said horizontal members consisting of a pair of pivoted laterally alignable and interlockable elements constituting a gate.

7. Portable burial apparatus as set forth in claim 1 wherein said top frame unit is detachably supported on the upper ends of said post members of said end frame units, said post members being of tubular cross-section and said top frame unit having depending connecting means slidably receivable into the upper ends of said tubular post members thereby preventing lateral displacement of said top frame unit from said post members.

8. Portable burial apparatus as set forth in claim 1 wherein said mobile means includes a roller-carrying unit that is supported on a pair of longitudinal track members carried on said front and rear side structural units and a wheel-supported platform also supported on said pair of longitudinal track members, the top face of said platform being disposed slightly below a horizontal line tangent with the tops of the rollers on said roller-carrying unit, an abutment carried by said platform spaced from one side of said platform, means for retaining said roller-carrying unit in stationary position as one end of on incoming casket passes over same and above the top face of said platform until the inner end of the casket engages said abutment whereupon said platform is caused to be moved by the incoming casket until by overbalance the greater portion of the inner end of the casket is caused to be assumed and carried by said platform during the remaining portion of its inward movement until the casket is centered over the grave cavity.

9. Portable burial apparatus as set forth in claim 1 wherein said casket raising and lowering mechanism comprises a speed reducing train of gears adapted under manual control to impart speed-reduced rotations to a single drum shaft, a pair of casket raising and lowering straps operable by said drum shaft, and coupling means operatively connecting said train of gears with said drum shaft, said drum shaft being adapted to be uncoupled from said train of gears upon axial movement thereof.

10. Portable burial apparatus of rectangular planar form adapted for laterally and vertically moving a casket and lowering the latter into a grave comprising: a plurality of interconnected structural units constructed of comparatively light-weight tubular posts and interconnecting tubular frame members, consisting of front and rear side structural units each including at both ends thereof a pair of upright laterally spaced parallel tubular twin corner posts, means for retaining said twin corner posts in upright parallel relatively spaced positions; a vertically adjustable framed unit at each end of the apparatus having a pair of laterally spaced vertical parallel tubular post members each slidably mounted within the space between one of said pairs of upright twin corner posts including a horizontal tubular member rigidly interconnecting said pair of tubular post members; a top frame unit consisting of tubular side and end members rigidly interconnected to form a rigid rectangular base supported on said tubular post members, casket raising and lowering means supported on said base; and mobile means carried on said front and rear side structural units adapted to support the casket while the latter is being moved thereon longitudinally of and within the apparatus to center the casket over the grave cavity.

11. Portable burial apparatus as set forth in claim 10 including a roof of waterproof material and supporting frame therefor carried on said top frame unit, and brackets mounted on said top frame unit base carrying curtains enclosing the sides and ends of the apparatus.

References Cited in the file of this patent

UNITED STATES PATENTS

| | | |
|---|---|---|
| 394,947 | Young | Dec. 18, 1888 |
| 445,875 | Brickell | Feb. 3, 1891 |
| 466,629 | Smith | Jan. 5, 1892 |
| 614,763 | Robb et al. | Nov. 22, 1898 |